(12) United States Patent
Berger et al.

(10) Patent No.: US 8,033,486 B2
(45) Date of Patent: Oct. 11, 2011

(54) WASTE LINE CONNECTOR ASSEMBLY

(75) Inventors: Thomas R Berger, Racine, WI (US);
Steven P Hanson, Racine, WI (US);
Scott W Anderson, Racine, WI (US)

(73) Assignee: Emerson Electric Co., St. Louis, MO (US)

( * ) Notice: Subject to any disclaimer, the term of this patent is extended or adjusted under 35 U.S.C. 154(b) by 1698 days.

(21) Appl. No.: 11/306,127

(22) Filed: Dec. 16, 2005

(65) Prior Publication Data

US 2007/0138327 A1 Jun. 21, 2007

(51) Int. Cl.
*B02C 23/36* (2006.01)

(52) U.S. Cl. ......... 241/46.012; 241/46.015; 241/46.016; 4/679; 4/696; 137/247.27

(58) Field of Classification Search ............... 241/46.01, 241/46.012–46.016; 138/155, 109; 137/247.27, 137/247.15, 846; 4/629, 679, 696, DIG. 4
See application file for complete search history.

(56) References Cited

U.S. PATENT DOCUMENTS

| | | | | |
|---|---|---|---|---|
| 2,286,520 A * | 6/1942 | Tranbarger | ............... | 241/46.014 |
| 2,843,328 A | 7/1958 | Stoynich | | |
| 2,928,615 A * | 3/1960 | Strehlow et al. | ............ | 241/46.01 |
| 2,946,525 A * | 7/1960 | Thierer | .................... | 241/46.015 |
| 3,510,069 A * | 5/1970 | Hannum | ......................... | 241/33 |
| 3,801,998 A | 4/1974 | Macias | | |
| 3,823,879 A * | 7/1974 | Johnson | ...................... | 241/101.2 |
| 3,857,589 A | 12/1974 | Oostenbrink | | |
| 4,036,512 A | 7/1977 | Francis | | |
| 4,135,258 A * | 1/1979 | Braga et al. | .............. | 241/46.015 |
| 5,075,905 A * | 12/1991 | Rutherford | .............. | 137/247.51 |
| 5,127,587 A * | 7/1992 | Johnson | ................... | 241/46.013 |
| 5,635,058 A | 6/1997 | Bowman | | |
| 5,676,319 A * | 10/1997 | Stiggins et al. | .......... | 241/46.012 |
| 5,901,731 A * | 5/1999 | Traylor | ...................... | 137/15.09 |
| 6,131,587 A * | 10/2000 | Chardack et al. | ............ | 134/95.2 |
| 6,454,872 B1* | 9/2002 | Miller et al. | .................... | 134/10 |
| 6,481,652 B2 | 11/2002 | Strutz et al. | | |
| 6,601,248 B1* | 8/2003 | Sage-Passant | .................... | 4/695 |
| 6,629,652 B2* | 10/2003 | Batten | ........................ | 241/24.11 |
| 6,651,272 B2* | 11/2003 | Bowman | ........................... | 4/679 |
| 6,772,968 B2* | 8/2004 | Jara-Almonte et al. | . | 241/46.013 |
| 7,448,405 B2* | 11/2008 | Shores | ......................... | 137/240 |

FOREIGN PATENT DOCUMENTS

GB 2094443 A * 9/1982

* cited by examiner

*Primary Examiner* — Bena Miller
(74) *Attorney, Agent, or Firm* — Harness, Dickey & Pierce, P.L.C.

(57) ABSTRACT

A waste line connector assembly for a food waste disposer includes a tailpipe member having a first inlet connectable to an outlet of a food waste disposer, a second inlet connectable to a waste water outlet of a dishwasher, and an outlet connectable to a waste or drain line. A one-way valve, such as a duck-bill valve, is in fluid communication with the second inlet. A flexible coupler, may be provided to be connected to the outlet, with one or both ends of the coupler being angled and rotatably connected to the outlet and/or the waste line so that the angular position of the waste line is variable relative to the tailpipe member.

18 Claims, 9 Drawing Sheets

WASTE LINE CONNECTOR ASSEMBLY

BACKGROUND

The present disclosure relates generally to food waste disposers, and more particularly, to a waste line assembly for food waste disposers.

Typically, most kitchen sinks, whether they are double compartment or single compartment sinks, have a bottom outlet plumbed directly to the main waste inlet of a conventional food waste disposer system. Wastewater from the sink flows down through the food waste disposer and exits horizontally via an outlet-plumbing elbow, provided with and attached to the disposer at its lower side portion, below the inlet. This in turn typically leads through a 90° bend vertically and downwardly into the upper inlet end of a standard plastic or brass tubular plumbing trap. Typically, the disposer also has a dishwasher drain line that is connected into the upper side portion of the food waste disposer, feeding the wastewater from the dishwasher through the disposer and out of the disposer outlet.

Problems have existed with such undercounter drain installations, including retrofit installations, regarding the manner and means for connecting the outlet end of the dishwasher waste water line to the standard food waste disposer drain plumbing fittings conventionally encountered in most household plumbing systems. Typically, as mentioned above, the dishwasher drain hose is connected to the drain plumbing in one of four ways—directly to the undersink drain connection in the instance that no food waste disposer is in place; directly to a food waste disposer dishwasher inlet leading to the food conveying section of the food waste disposer, such as shown in U.S. Pat. No. 6,481,652B2; to the undersink dishwasher drain connection via an air-gap; and, to a food waste disposer inlet leading to the food conveying section of the food waste disposer. However, several potential problems exist with these installations, especially where a food waste disposer is involved. First, when water drains from a dishwasher at the end of a cycle, a large volume of wastewater (typically about 6-10 gallons, depending on the number of washes and rinses included in that particular cycle and the particular machine being used) is pumped out of the dishwashing machine, through the waste lines, and into the sewer/septic drainage system. If a food waste disposer is included in the waste water loop, as is often the case, the food conveying section/grind chamber of the food waste disposer must be of a substantial size to accommodate the large volume of wastewater passing though it when the dishwashing machine finishes a cycle. This in turn results in larger, heavier, and bulkier food waste disposers being installed under sinks.

Additionally, while dishwashers typically drain directly into the household drain plumbing, most kitchen compartment sinks have their sole bottom outlet plumbed directly to the main waste inlet of a conventional food waste disposer, wherein waste water from the sink flows through the waste disposer and exits horizontally via an outlet plumbing elbow attached to the disposer at its lower side. As a result of this setup, dishwasher drain lines are often connected directly to the food waste disposer at the upper side of the disposer, and drain out of a lower disposer outlet. Since the wastewater discharge lines of the dishwasher are typically directly linked to the food conveying section of the food waste disposer, wastewater can potentially backup due to, for example, a clog in the grinding plate section of the food waste disposer.

Thus, there exists a need for a way to provide an improved dishwasher waste water drain line outlet connection system and adaptable coupling hardware which overcomes the aforementioned problems in a simple, efficient, reliable and economical manner.

SUMMARY

A waste line connector assembly for a food waste disposer includes a tailpipe member having a first inlet connectable to an outlet of a food waste disposer, a second inlet connectable to a wastewater outlet of a dishwasher, and an outlet connectable to a waste or drain line. A one-way valve, such as a duck-bill valve, is in fluid communication with the second inlet. In exemplary embodiments, the tailpipe member is rigid and composed of plastic. The second inlet may include a rigid, generally tubular member composed of plastic.

In accordance with further aspects of the disclosed system, a coupler is connected to the outlet. In some embodiments, one or both ends of the coupler are angled and rotatably connected to the outlet and/or the waste line so that the angular position of the waste line is variable relative to the tailpipe member. In accordance with other aspects of the disclosed system, the coupler is at least partially flexible to vibrationally isolate the disposer from the waste line. The coupler may be made of an elastomeric material, for example.

BRIEF DESCRIPTION OF THE DRAWINGS

Other objects and advantages of the invention will become apparent upon reading the following detailed description and upon reference to the drawings in which.

Figure 1:
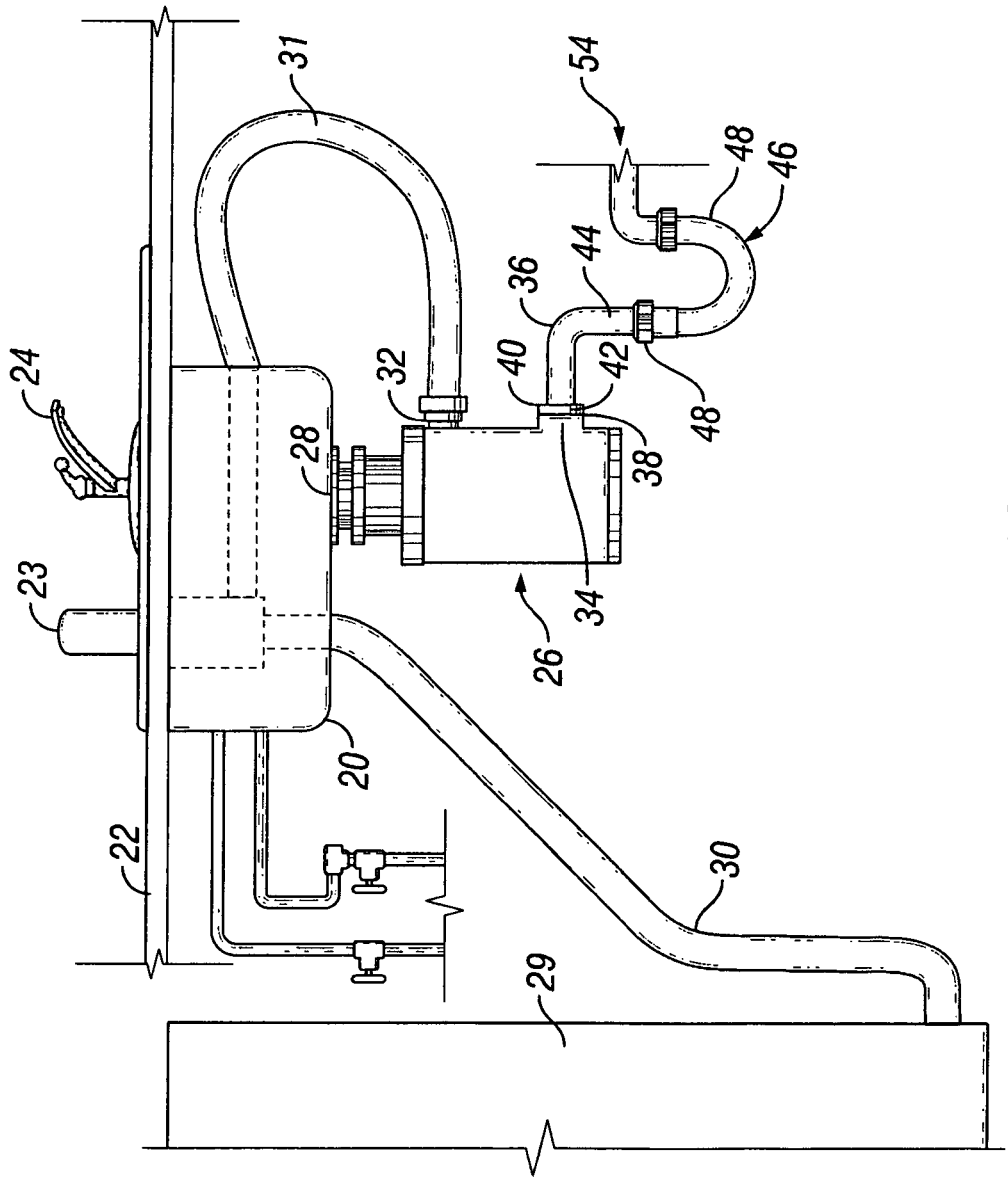
FIG. 1 is a front view of a prior art food waste disposer system having a connection to a dishwasher.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring first to FIG. 1, a typical residential single compartment kitchen sink with a typical undercounter installation is illustrated. Such a single sink set-up includes a single compartment sink 20 mounted to or through a suitable opening in a kitchen counter 22, and an associated water dispensing faucet 24. A conventional food waste disposer 26 is shown suspended in the usual manner underneath sink 20 with its upper main inlet in communication with the single sink waste outlet, or drain, 28. A conventional under-counter automatic dishwasher unit 29 is also shown in relationship to the sink and food waste disposer, having a dishwater drain line 30 (having, in most instances, a ⅝" inside diameter, I.D.) connected via a conventional sink top-mounted air gap unit 23, and then via a dishwasher air gap drain line hose 31 (having in most instances a ⅞" I.D.) to the upper side inlet nipple fitting 32 of food waste disposer 26. The outlet 34 of disposer 26 is typically coupled to a waste line elbow 36 by a flange clamp 38 and associated mounting bolt(s) 40, the connection being sealed by a disposer drain gasket 42. The vertical run 44 of elbow 36 is typically connected to a conventional sink P-trap 46 (which can optionally have a cleanout, not shown) by a slip joint (S/J) nut 48 and, optionally, an associated slip joint beveled washer (not shown). The outlet of trap 46 is similarly connected by a S/J nut 48 to waste line 54, leading to the main sewer drain line of the household. Typically, the food waste disposer installation instructions require that the disposer waste line 54 and associated trap 46 be plumbed at the appropriate elevation to prevent standing water in the disposer motor housing.

Figure 2:
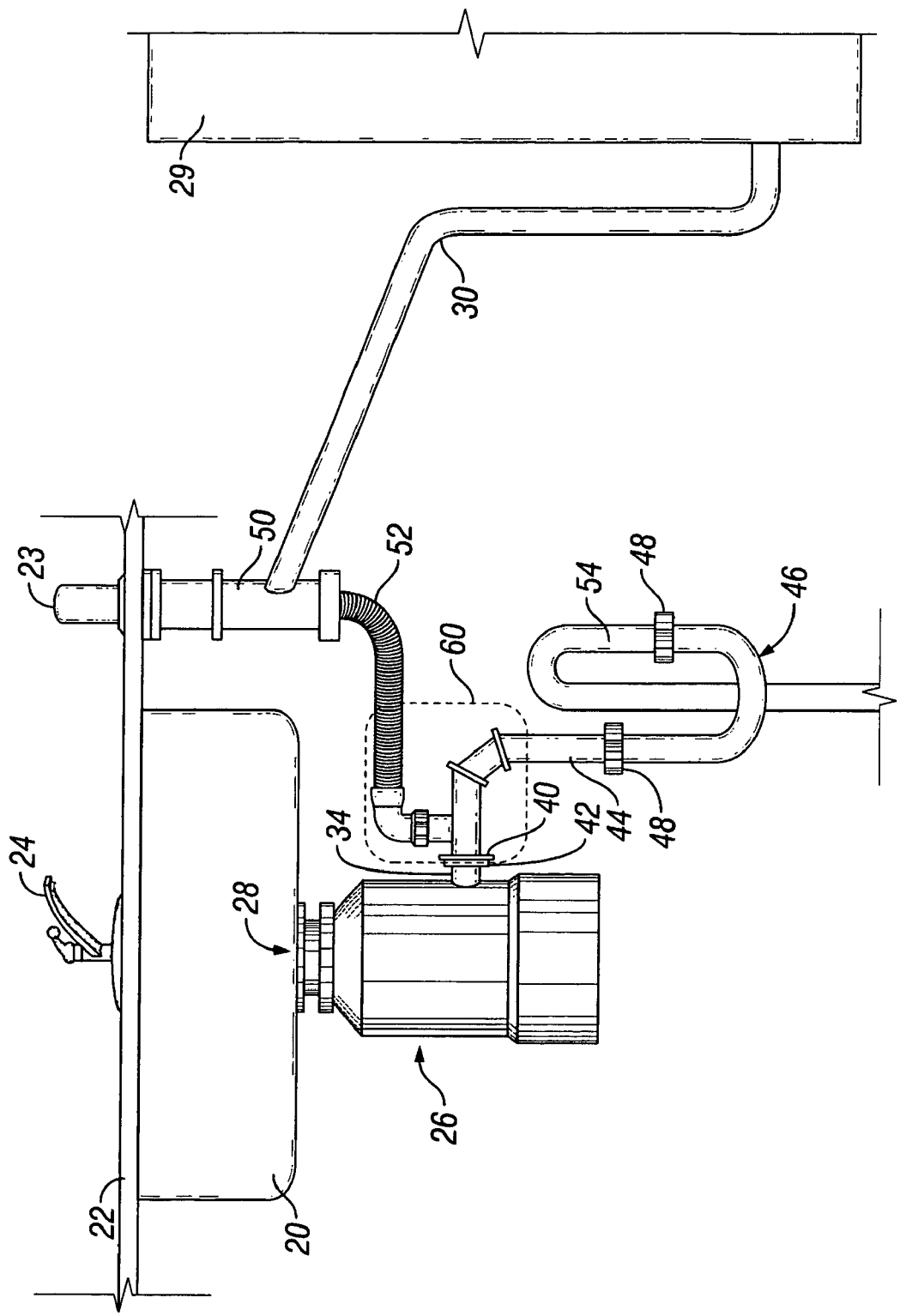
FIG. 2 is a front view of a food waste disposer system in accordance with the present disclosure.

Referring to FIG. 2, the single sink/disposer kitchen undercounter installation of FIG. 1 is shown in conjunction with a waste line connection system 60. As illustrated therein, and in accordance with the present disclosure, the use of such a system 60, which comprises a one-way flow valve (not shown in FIG. 2), allows the wastewater from the dishwasher drain line 52 to drain almost directly into the disposer waste line to the sewer of the residence, thereby eliminating the potential for backflow and/or dishwasher contamination which exists in directing the wastewater through the food waste disposer 26. Further, by eliminating the flow of the large volumes of water typically associated with residential dishwashers through the disposer, the size and bulk of the disposers can be diminished, especially in the top, inlet chamber section, which can in turn result in more under-sink space.

Figure 3A:
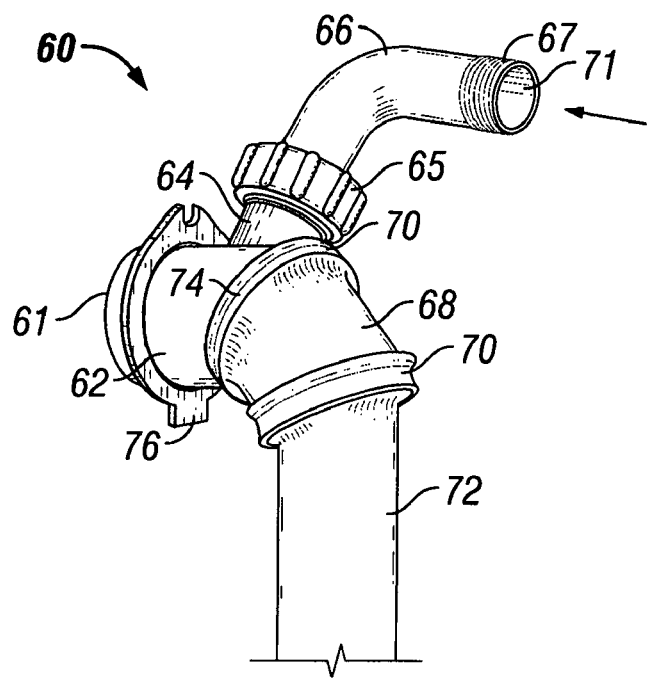
FIGS. 3A and 3B are side perspective views of a food waste disposer waste line connection system according to aspects of the present disclosure.
Figure 3B:
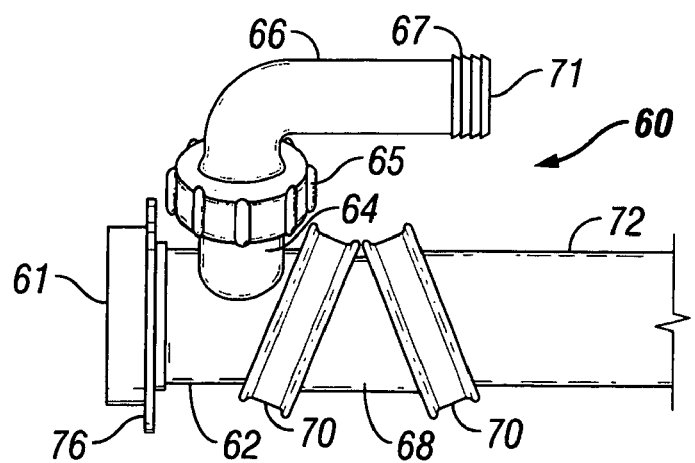

A side perspective view of the waste line system 60 in accordance with an aspect of the present invention is shown in FIGS. 3A and 3B. As shown therein, system 60 comprises a tailpipe member 62 having two inlets and a single outlet. The particular tailpipe illustrated is a Tee-fitting 62 having one inlet 61 connected to the outlet 34 of the disposer and another inlet 64 in the form of a tubular projection connected to a waste water adapter 66. The waste water adapter is connected to the waste water outlet of a dishwasher, for example, via a line 52 as shown in FIG. 2. The adapter 66 defines annular hose barbs 67 at one end and is threadably attached to the inlet 64 by a slip joint (S/J) nut 65. The tailpipe drain line system 60 further includes flange 76 for use in releasably or permanently attaching system 60 to the drain outlet of the food waste disposer (not shown in FIGS. 3A or 3B). In the exemplary illustrated embodiment, a coupler 68 connects a waste line or pipe 72 to the Tee-fitting 62. In other embodiments, different couplers may be used, or the Tee-fitting 62 can be integrally formed with the waste line 72.

The opposite ends 70 of the illustrated coupler 68 are angled and are rotatably connected to the Tee-fitting 62 and waste line 72, so that simply rotating the coupler 68 relative to the Tee-fitting 62 and/or waste line 72 allows easily configuring the system to fit many different plumbing installations. The ends 70 may be connected to the Tee-fitting 62 using standard hose clamps, for example. As shown in FIG. 3A, the assembly 60 is positioned in an elbow shape generally defining a right angle. By rotating the coupler 68, the angular position of the waste pipe 72 relative to the Tee-fitting 62 can be changed to other positions, such as the position shown in FIG. 3B in which the waste pipe 72 is generally in-line with the main body of the Tee-fitting 62.

Further, in certain embodiments, the illustrated coupler 68 is flexible to reduce the vibrational forces from the disposer that may be imposed on other portions of the household plumbing lines. In other embodiments of the waste line systems not employing the Tee-fitting 62, the coupler is used to attach the discharge outlet 34 to the waste line 72 in the manner disclosed in commonly assigned U.S. Pat. No. 6,772, 968B2, which is incorporated by reference, to allow easy adjustment of the waste line connector assembly to fit different plumbing configurations. In such implementations, the coupler 68 can be attached directly to the discharge outlet 34, or a rigid tailpipe section may be situated between the discharge outlet 34 and the coupler 68. The flexible coupler in the embodiments illustrated herein is made of an elastomeric material such as rubber or another flexible material such as Thermoplastic Elastomers (TPEs) or Thermoplastic Rubbers (TPRs).

Figure 4:
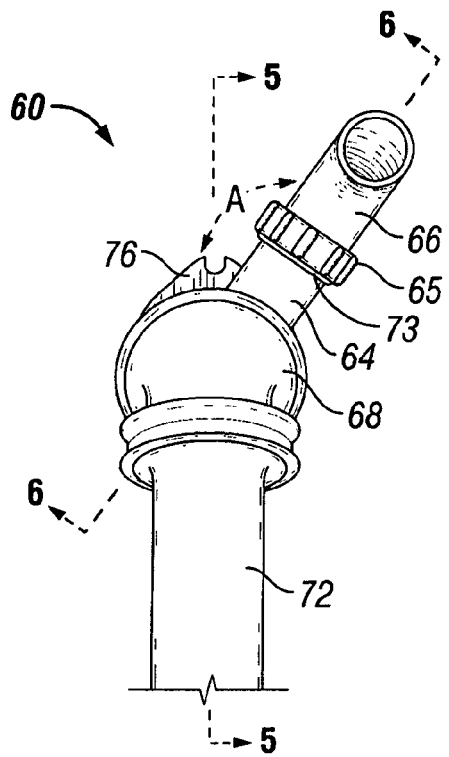
FIG. 4 is a rear view of the system of FIGS. 3A and 3B.
Figure 5:
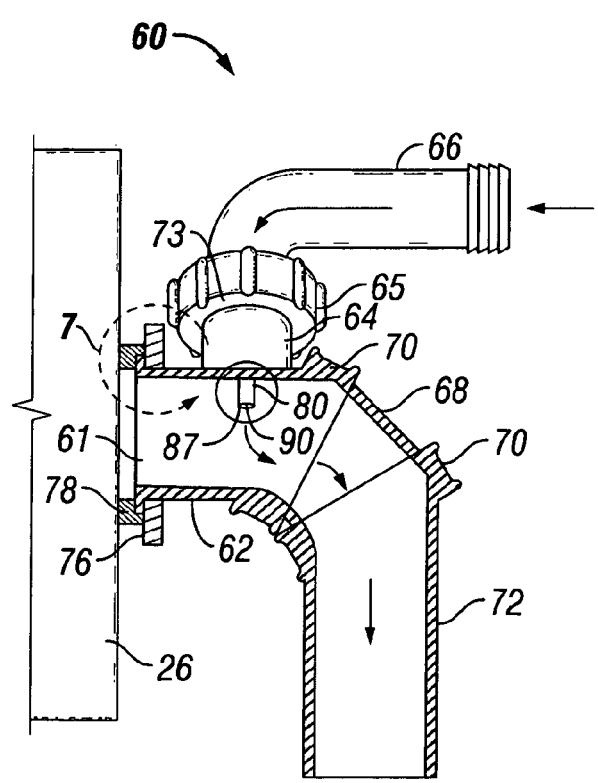
FIG. 5 is a view taken along line 5-5 of FIG. 4.

Rear perspective and partial cut-away section views of the system 60 are illustrated in FIGS. 4 and 5, respectively. As shown therein, side inlet 64 of Tee-fitting 62 is substantially tubular, and comprises a hollow main bore portion having external threads at distal end 73. Inlet 64 intersects the main barrel portion of Tee-fitting 62 at an included acute angle "A" between the center line axis 5-5 of system 60. Angle "A" can typically vary in a range between about 0° (wherein inlet 64 is substantially perpendicular to the center line axis 5-5) and about 90° (wherein inlet 64 is substantially parallel to the center line axis 5-5). While angle "A" can vary as described, typically angle "A" is in the range from about 30° to about 55°. As illustrated in FIG. 4, angle "A" is about 40°.

The section view of FIG. 5 is taken along the line 5-5 of FIG. 4. A one-way flow control valve 80 is in fluid communication with the inlet 64. In FIG. 5, a portion of an exemplary embodiment of one-way inlet flow control valve 80 can be seen, with orifice 90 facing inward towards the interior of Tee-fitting 62. The illustrated valve 80 is shown as a "duckbill" valve, though other one-way valves could be used. As indicated by the arrows, waste water from a dishwasher drain pipe flows through adapter 66 and out the orifice 90 of the flow control valve 80 into the interior region of Tee 62, whereupon the waste water flows through the coupler 68 and into waste line 72, after which the waste water flows into the sewer system of the residence.

Figure 6:
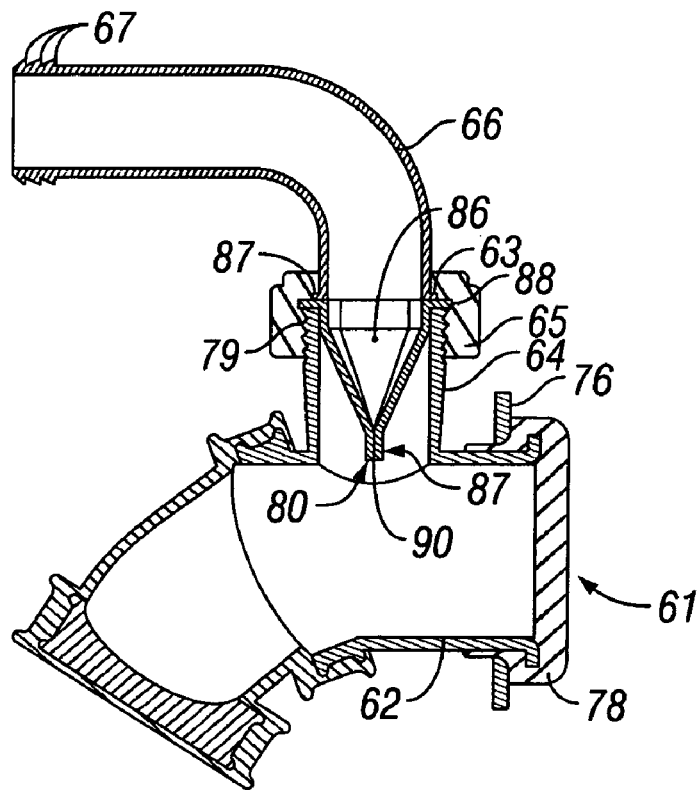
FIG. 6 is a view taken along line 6-6 of FIG. 4.

Further details of the system 60 of the present invention are shown in FIG. 6, which shows a partial cut-away view of system 60 taken along line 6-6 in FIG. 4. As shown therein, one-way valve 80, having a generally tapered, conical shape with an orifice 90 at its distal end 87 directed towards the interior of Tee 62 via tubular inlet 64. Typically, in accordance with one aspect of the present invention, valve 80 is positioned such that circumferential lip 88 of valve 80 rests atop the external threads of inlet 64. As further illustrated in FIG. 6, adapter 66 is positioned atop valve 80, such that lip portion 63 of adapter 66 is in contact with, and substantially aligned with, lip portion 88 of valve 80. S/J nut 65 then threadably seals with external threads 79 of inlet 64, providing a substantially sealed one-way inlet valving system wherein the valve 80 is clamped between inlet 64 and adapter 66. While not used or illustrated in system 60 constructed as shown in FIG. 6, the upper end of inlet 64 having threads 79 can optionally cooperate with a standard slip joint (S/J) beveled polyethylene washer, adapted to be clamped between the inner diameter lip of S/J nut 65 and lip 63 of the waste water adapter 66 as the nut is threaded downwardly on external threads 79 of inlet 64, thereby squeezing the inner periphery of the washer against the lip 63 of adapter 66.

Figure 7:
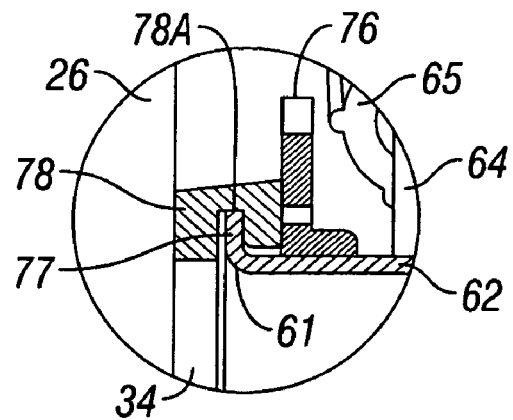
FIG. 7 is a detail of section 7 of FIG. 5.

A detail of the connectivity of system 60 to the food waste disposer 26 is shown in FIG. 7, illustrating a blow-up view of the area indicated by 7 in FIG. 5. As shown therein, the inlet 61 of Tee-fitting 62 is attached to outlet 34 of food waste disposer 26 by hub adapter 78 attached to the external face of disposer 26. Typically, and in accordance with one aspect of the present invention, the inlet 61 of fitting 62 is shaped so as to have a disposer attachment flange 77 around the entire circumference of the inlet 61. In use, flange 77 fits into annular groove 78a in hub adapter 78, and sealing flange 76 rests against both adapter 78 and fitting 62 as illustrated. The entire system 60 can then be removably or permanently attached to disposer 26 using mounting bolts or other suitable devices (not shown).

Figure 8:
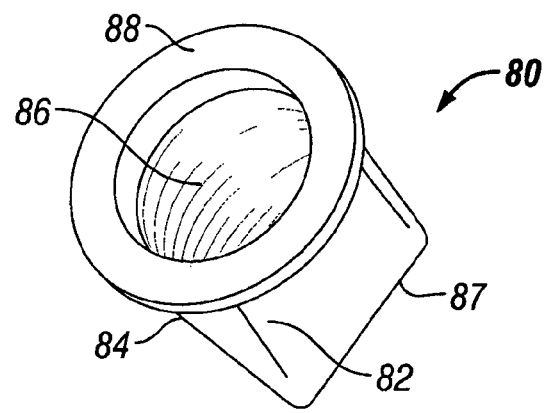
FIG. 8 is a perspective view of an inlet valve in accordance with one aspect of the present invention.
Figure 9:
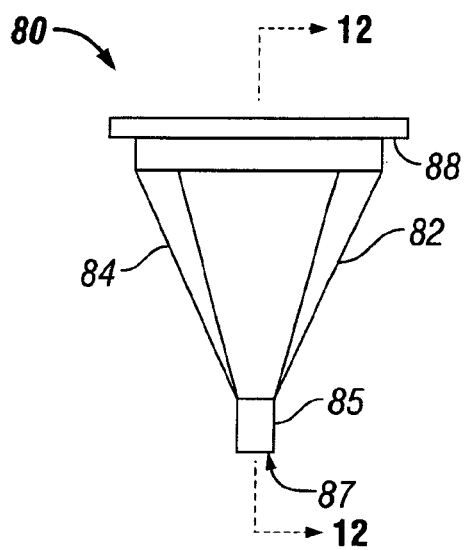
FIG. 9 is a side view of the inlet valve of FIG. 8.
Figure 10:
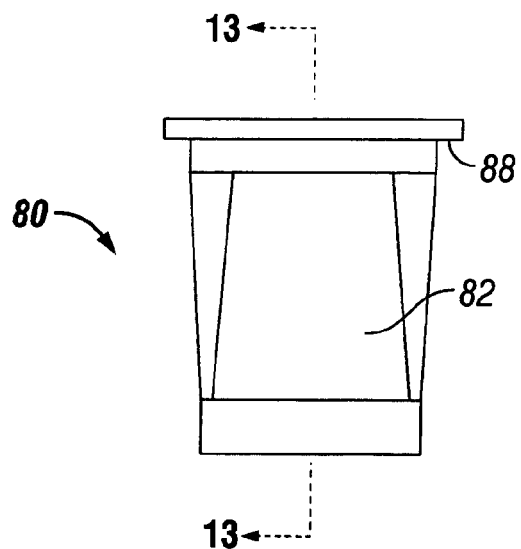
FIG. 10 is a front view of the inlet valve of FIG. 8.
Figure 11:
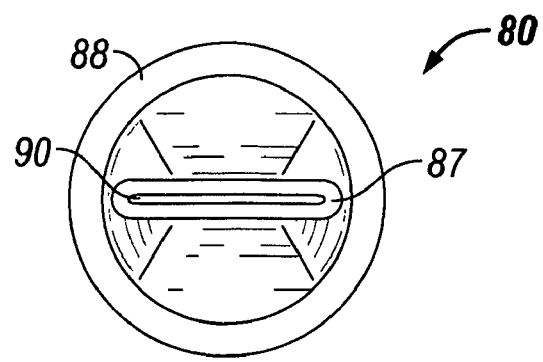
FIG. 11 is a bottom view of the inlet valve of FIG. 8.
Figure 12:
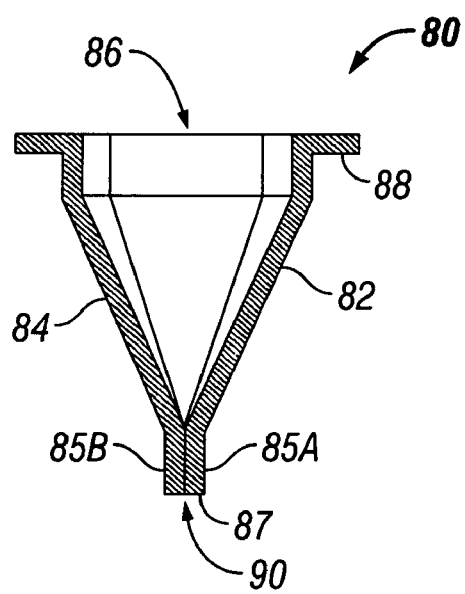
FIG. 12 is a view taken along line 13-13 of FIG. 10.
Figure 13:
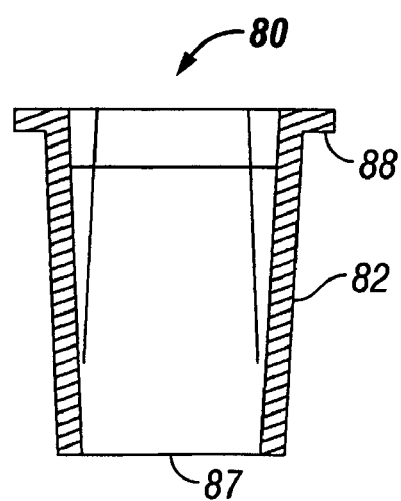
FIG. 13 is a view taken along line 12-12 of FIG. 9.

The tailpipe inlet valve 80, which is a one-way flow control valve, is shown in perspective in FIG. 8. The one-way valve 80 comprises a front face 82, a rear face 84, and a lip portion 88, and is formed such that the lip portion 88 is formed around the faces 82 and 84. Faces 82 and 84 slope away from lip portion 88 toward distal end 87 so as to form a valve body which is truncated to be almost conical and trapezoidal in shape. This is more readily apparent in FIG. 9, wherein faces 82 and 84 can be seen tapering away from lip 88 toward distal end 87 so as to form a substantially conical body of the valve, terminating in flexible valve exit members 85. FIG. 12 illustrates valve 80 in cut-away, taken along line 13-13 in FIG. 10. As shown in FIG. 12, the termination of flexible valve members 85a and 85b at the distal end 87 of front and rear faces 82 and 84 of one-way valve 80 results in the formation of orifice 90. Orifice 90 can be seen in more clear detail in FIG. 11. As shown therein, orifice 90 is typically an elongated, substantially linear slit. However, in accordance with the present invention, orifice 90 can take on a number of different forms, including H-shaped, T-shaped, and X-shaped, as necessary or warranted by the particular conditions.

Referring again to FIG. 12, flexible valve exit members 85a and 85b in combination with internal cavity 86 of inlet valve 80 form a one-way flow valve which allows liquids (e.g., waste water) to exit the valve as the force of the liquid flowing through cavity 86 toward the distal end 87 of the valve. As the liquid nears the distal end 87 of valve 80, the force of the flowing liquid forces flexible members 85a and 85b apart, thereby opening orifice 90 to form an exit for the flowing liquid. The liquid can then freely flow out of the drain lines through valve 80 and into waste line 72 by way of side inlet 64, tee 62, and coupler 68. Due to the shape and structural characteristics of flexible members 85 of inlet valve 80, liquids are not allowed to flow backwards and enter the internal cavity 86 through distal end 87, by virtue of the combination of the engagement of valve 80 with tee 62 and adaptor 66, as well as the shape truncated, conical and trapezoidal shape characteristics of valve 80. In this manner, contamination of dishware in a dishwasher is substantially eliminated by the prevention of waste water flowback, either from the dishwasher waste water, or from a food waste disposer in that the drain line from the dishwasher bypasses the disposer. The valve 80 can be made from a variety of suitable materials which provide the desired flexibility, heat resistance, and chemical resistance (due to the harsh chemical nature of cleansers used in dishwashers).

Figure 14:
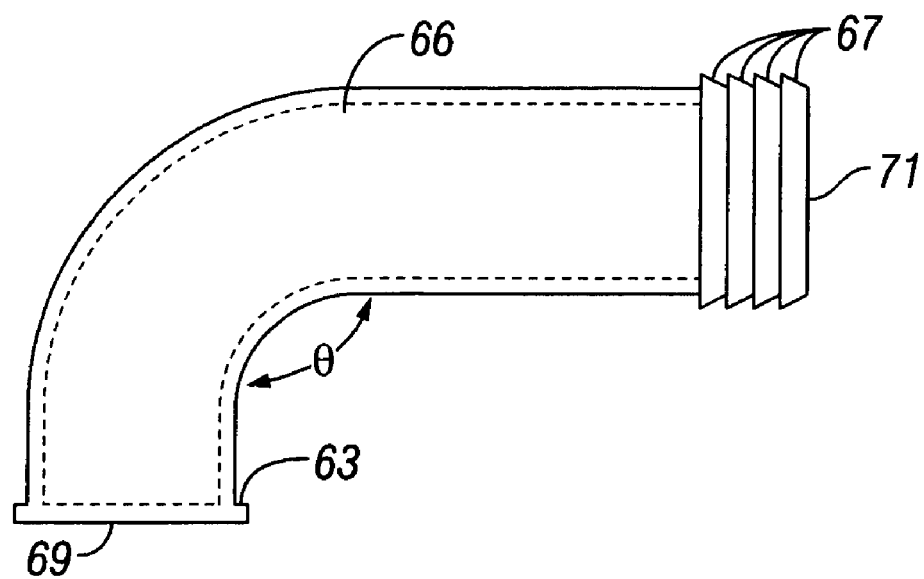
FIG. 14 is a side view of a waste water adapter coupling in accordance with an aspect of the present invention.
Figure 15:
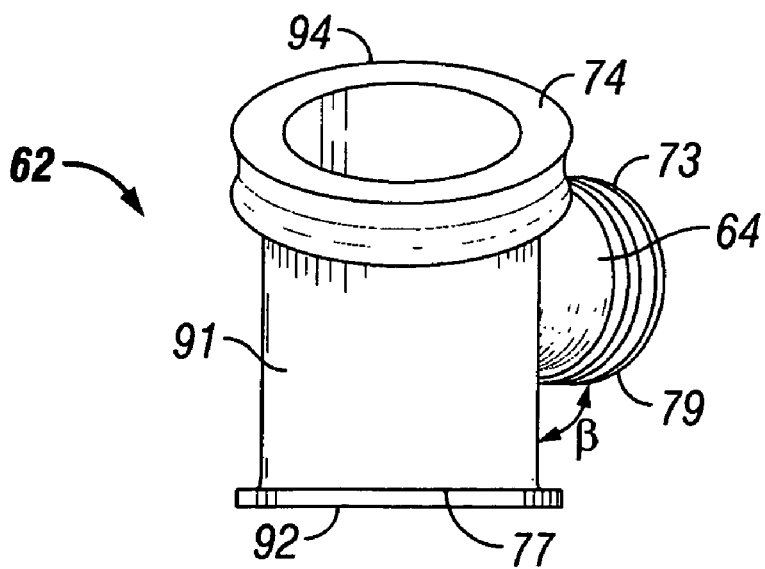
FIG. 15 is a perspective view of a "T"-type adaptor in accordance with an aspect of the present disclosure.

FIGS. 14 and 15 illustrate in more detail several of the features of waste water adapter coupling 66 and specially designed Tee-fitting 62, respectively. As mentioned previously, couplings and adapters of drain line system 60 in accordance with the present invention are typically made up almost entirely of inexepensive, commercially available rigid tubular plastic plumbing and fitting material, such as polypropylene (PP), polyvinylchloride (PVC), flexible reinforced PVC, or acetal materials currently mass produced for the household plumbing fitting industry.

Referring in more detail to FIG. 14, waste water adapter coupling 66 is generally a rigid tubular plastic fitting provided with a lip portion 63 on its proximal end 69 and a plurality of rows of annular hose nipple barbs 67 integrally mold formed on the exterior surface of the distal end 71 of coupling 66, so as to form a hose nipple inlet at the distal end. Adapter coupling 66 is illustrated in FIG. 14 as having an acute angle θ of about 90°, such that proximal end 69 of coupling 66 is substantially perpendicular to distal end 71. However, it will be understood that angle θ can be either an acute angle, in the range of about 50° to about 90°, or an obtuse angle, in the range of about 90° to about 180°. Annular hose nipple barbs 67 on the exterior surface of adapter coupling 66 are diametrically sized for a sealing slip fit thereon of a dishwasher flexible drain hose 52 (see FIG. 2) having an inside diameter of about ⅝ inches, although nipple barbs 67 can also be optionally mold-formed to be diametrically sized so as to receive with a sealing slip fit thereon a larger diameter dishwasher flexible drain hose 52, i.e., having an inside diameter of about ⅞ inches. As such, and in accordance with the present invention, the outside diameters (O.D.) of barbs 67 are preferably adapted to respectively accommodate the two most common dishwasher drain hose sizes currently prevalent in use on household residential dishwasher appliances.

The Tee-fitting 62 is shown in more detail in FIG. 15. Tee 62 comprises a double-ended hollow, tubular main barrel portion 91 having a proximal end 92 and a distal end 94, and a hollow branch inlet 64 in the form of a tubular projection intersecting barrel portion 91 at an included acute angle B, wherein B can vary preferably in a range from about 30° to about 90°. The distal end 73 of tubular projection 64 of Tee 62 is provided with external threads 79 integrally mold formed onto the exterior surface of end 73, so as to threadably receive a slip-joint (S/J) nut 65. External threads 79 allow inlet valve 80 to be attached to Tee 62 via inlet projection 64, wherein valve 80 and adapter 66 are held in place by an S/J nut. Proximal end 92 of Tee 62 comprises a disposer attachment flange for attaching the tailpipe drain line system 60 to a food waste disposer, while distal end 94 includes an upper flange for connecting Tee 62 to the coupler 68 (see FIGS. 3A and 3B).

Figure 16:
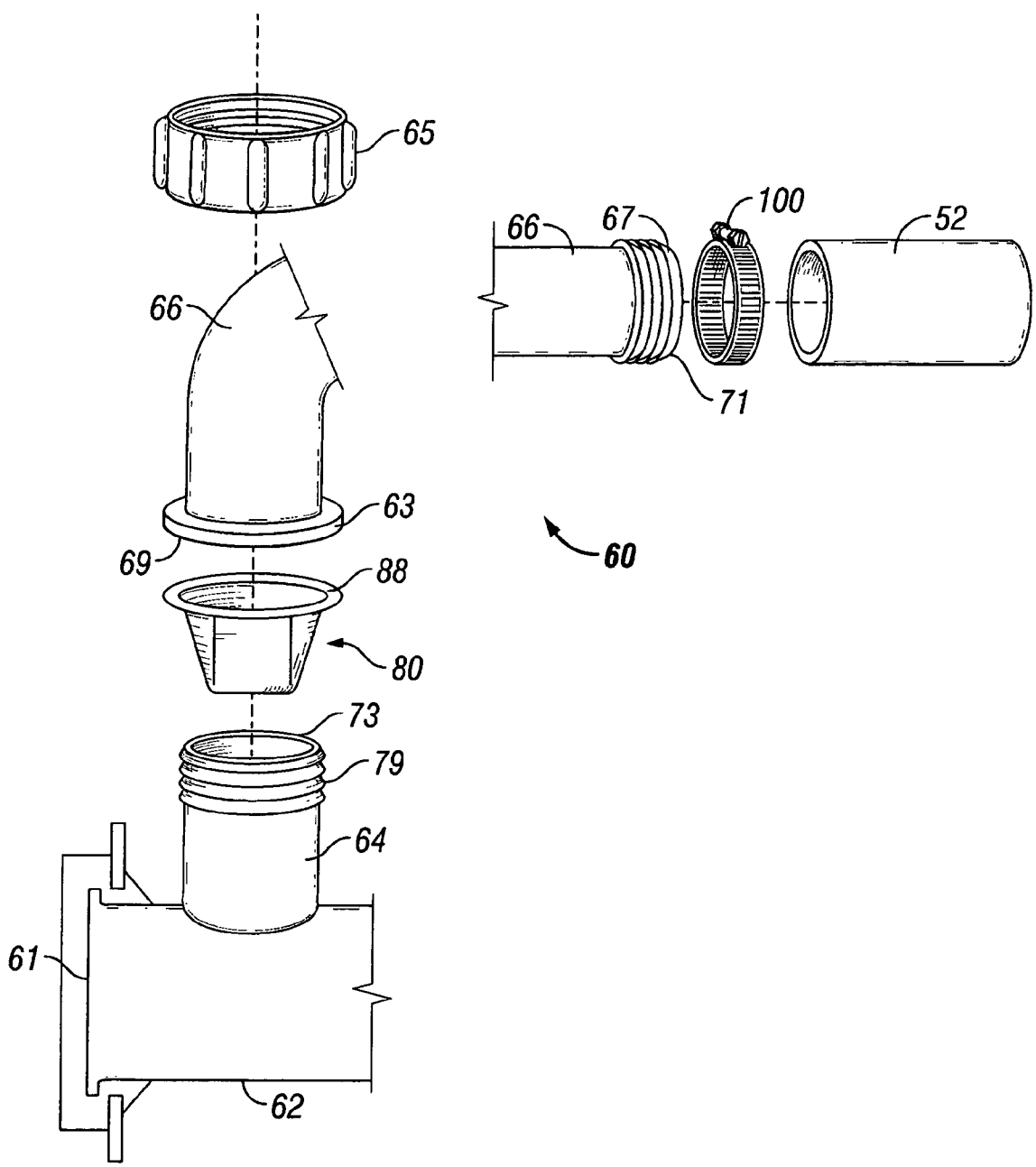
FIG. 16 is a fragmentary, exploded perspective view of the waste line connection system showing installation of the system as employed in conjunction with a dishwasher drain hose in the setup of FIG. 2.

Referring to FIG. 16, typically the tailpipe drain line system 60 is provided to both the professional as well as the home do-it-yourself market as a convenient drain line adapter kit for existing as well as new undersink plumbing configurations. Such a kit could include at least Tee 62, valve 80, adapter 66, and S/J nut 65, as well as one or more standard, commercially available stainless steel hose clamps 100, along with printed installation instructions. This kit in use provides all that is needed in materials to make a quick and inexpensive connection of the dishwasher wastewater drain tube 52 to the existing undercounter household plumbing system for sink 20 provided with a food waste disposer 26 and an associated automatic dishwasher 29, in a manner which allows for the dishwasher drain tube 52 to bypass the inlet 32 of the food waste disposer 26 (see FIG. 1).

Considering a situation wherein a dishwasher 29 has a dishwasher drain hose 52 connected downstream of an air gap 23 as shown in FIG. 1, standard disposer drain tube 36 is removed from outlet 34 of disposer 26 by loosing mounting bolts 40 and the flange clamp 38. The old disposer drain gasket 42 can be retained, or discarded and replaced with flange 76 of system 60. Referring now to FIG. 16, with the hose clamp 100 loosely sleeved on the distal end 71 of waste water adapter 66, valve 80 is set down into inlet 64 of Tee 62, such that the annular lip of one-way valve 80 rests squarely on the distal end 73 of side inlet 64, atop external threads 79. Waste water adapter 66 is then set atop one-way valve 80, such that lip portion 63 of adapter 66 is in contact with, and substantially aligned with, the top portion of lip 88 of valve 80. S/J nut 65 is then slid over adapter 66 from distal end 71 and the adapter 66 and valve 80 are sealably attached to Tee 62 by threading S/J nut 65 onto external threads 79 of side inlet 65. Dishwasher drain hose 52 is then sealingly slip fit onto and substantially over annular nipple barbs 67 so as to entirely cover barbs 67. The dishwasher drain hose 52 can then be securely attached using hose clamp 100.

While the present invention has been described specifically for use with dishwasher waste water lines, it is envisioned that the system of the present invention can also be used in association with sink-mounted super-heated water dispensing systems, reverse osmosis (R/O) systems applied to the purification of water which produce a continuous flow of waste water during normal operating conditions and may amount to as much as 75% of the input water volume and often has a high salt content. In many municipalities, this waste water (or brine, as it is termed when it has a high salt content) must have a continuous draining facility for removing the processed water from the R/O system, and requires some form of anti-siphon means (such as an air-gap) to prevent the possibility of sewage or tainted water backing up into the reverse osmosis system through the drain for the waste water or brine. Typically, such waste water drain lines from the undercounter R/O systems are retrofit to, or tied into, the standard inlet lines and/or fittings of food waste disposers conventionally encountered in most household plumbing systems, upstream of the sewer trap. A problem inherent in passing the waste water or brine from the R/O system through the food waste disposer is that over time, the corrosive nature of the brine can result in operational and/or structural problems with the interior of the disposer (e.g., corroded grinding plates, frozen motors, and the like). Further, plumbing codes have prohibited the connection of R/O waste water drain lines anywhere in the outlet plumbing of the food waste disposer due to concerns of clogging by the relatively high velocity discharge from the disposer when it is operated in the grinding mode so as to wash down refuse.

Accordingly, the tailpipe drain line system incorporating a one-way flow valve as described herein is envisioned to be able to provide an improved R/O waste water drain line outlet connection system which would overcome the aforementioned problems in a simple, reliable, and economical manner. For example, it is envisioned that a conventional baffle Tee-fitting could be used to connect the R/O drain lines with the dishwasher drain lines, which together could be attached to adapter 66 of system 60.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A waste line connector assembly for a food waste disposer, comprising:
a tailpipe member having a first inlet connectable to an outlet of a food waste disposer, a second inlet connectable to a waste water outlet of a dishwasher, and an outlet connectable to a waste line to which waste water from the food waste disposer is discharged; and
a one-way valve in fluid communication with the second inlet.

2. The waste line connector assembly of claim 1, wherein the one-way valve is a duck-bill valve.

3. The waste line connector assembly of claim 1, wherein the second inlet includes a generally tubular member that intersects a tubular portion of the tailpipe member.

4. The waste line connector assembly of claim 1, wherein the tailpipe member is rigid and composed of plastic.

5. The waste line connector assembly of claim 1, wherein the second inlet includes a rigid generally tubular member composed of plastic.

6. The waste line connector assembly of claim 1, further comprising a coupler connected to the outlet of the tailpipe member.

7. The waste line connector assembly of claim 6, wherein the coupler has a straight body that has first and second opposed ends angled with respect to each other, the first opposed end rotatably connected to the outlet of the tailpipe member and the second opposed end rotatably connected to the waste line so that the angular position of the waste line is variable relative to the tailpipe member.

8. The waste line connector assembly of claim 6, wherein the coupler defines an angled end rotatably connectable to a waste line so that the angular position of the waste line is variable relative to the tailpipe member.

9. The waste line connector assembly of claim 6, wherein the coupler defines first and second angled opposite ends, the first angled end being rotatably connected to the outlet and the second angled end being rotatably connectable to a waste line so that the angular position of the waste line is variable relative to the tailpipe member.

10. The waste line connector assembly of claim 6, wherein the coupler is at least partially flexible.

11. The waste line connector assembly of claim 10, wherein the coupler is made of an elastomeric material.

12. A waste line connector assembly for a food waste disposer, comprising:
a coupler having a straight body that has first and second opposed ends angled with respect to each other, the first opposed end rotatably connectable to an outlet of a food waste disposer and the second opposed end rotatably connectable to a waste line to which waste water from the food waste disposer is discharged;

wherein the angular position of the waste line is variable relative to the outlet of the food waste disposer by rotating the coupler.

13. The waste line connector assembly of claim 12, wherein the coupler is at least partially flexible.

14. The waste line connector assembly of claim 13, wherein the coupler is made of an elastomeric material.

15. The waste line connector assembly of claim 12, further comprising a tailpipe member having:
    a first inlet connectable to the outlet of the food waste disposer;
    a second inlet connectable to a waste water outlet of a dishwasher; and
    an outlet connected to the first opposed end of the coupler.

16. The waste line connector assembly of claim 12, wherein the second inlet includes a rigid generally tubular member composed of plastic.

17. A waste line connector assembly for a food waste disposer, comprising:
    a tailpipe member having a first inlet connectable to an outlet of a food waste disposer, a second inlet connectable to a waste water outlet of a dishwasher, and an outlet; and
    a flexible coupler having a first end connected to the outlet of the tailpipe member and a second end connectable to a waste line to which waste water from the food waste disposer is discharged.

18. The waste line connector assembly of claim 17, wherein the coupler is made of an elastomeric material.

* * * * *